United States Patent
Schlör et al.

(10) Patent No.: US 6,193,773 B1
(45) Date of Patent: Feb. 27, 2001

(54) DUST FILTER BAG

(75) Inventors: Ulrich Schlör, Darmstadt; Klaus Veeser, Weinheim, both of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/358,087

(22) Filed: Jul. 21, 1999

(30) Foreign Application Priority Data

Jul. 21, 1998 (DE) .............................................. 198 32 611

(51) Int. Cl.[7] .................................................. B01D 46/02
(52) U.S. Cl. ........................... 55/382; 55/486; 55/DIG. 2; 15/347; 15/DIG. 8
(58) Field of Search .................. 15/347, DIG. 8; 55/382, 486, 487, DIG. 62

(56) References Cited

U.S. PATENT DOCUMENTS

| | | | |
|---|---|---|---|
| 4,116,648 | * 9/1978 | Busch | 55/382 |
| 4,164,400 | * 8/1979 | Wald | 55/382 |
| 4,257,791 | * 3/1981 | Wald | 55/382 |
| 4,589,894 | * 5/1986 | Gin et al. | 55/382 |
| 4,917,942 | * 4/1990 | Winters | 55/486 |
| 4,976,858 | * 12/1990 | Kadoya | 55/486 |
| 5,080,702 | * 1/1992 | Bosses | 55/382 |
| 5,244,703 | * 9/1993 | Bosses | 55/382 |
| 5,437,910 | * 8/1995 | Raabe et al. | 55/382 |
| 5,527,429 | * 6/1996 | Dambreville et al. | 55/382 |
| 5,647,881 | * 7/1997 | Zhang et al. | 55/DIG. 2 |
| 5,667,562 | * 9/1997 | Midkiff | 55/486 |
| 6,045,595 | * 4/2000 | Freudenberg | 55/382 |

FOREIGN PATENT DOCUMENTS

| | | |
|---|---|---|
| 196 06 718 | 8/1997 | (DE) . |
| 0 338 479 | 10/1989 | (EP) . |
| 0 635 297 | 1/1995 | (EP) . |
| 55-67314 | * 5/1980 | (JP) ........... 55/382 |

* cited by examiner

Primary Examiner—Peter A. Hruskoci
(74) Attorney, Agent, or Firm—Kenyon & Kenyon

(57) ABSTRACT

A dust filter bag made of a fiber layer laminated together with a paper layer. The fiber layer is made of synthetic polymer fibers and is arranged on the downstream side of the paper layer. To increase the strength of the dust filter bag, the fiber layer contains melted polymer regions and by way of the polymer regions the fiber layer is additionally consolidated within itself and joined to the paper layer. The polymer regions have a welded area of 0.5 to 10% of the surface area, preferably 1 to 3%, thus resulting in sufficient laminate strength with a low pressure drop.

21 Claims, 5 Drawing Sheets

DUST FILTER BAG

FIELD OF THE INVENTION

The invention relates to a dust filter bag made of a fiber layer laminated together with a paper layer. A wide variety of demands are placed on such filter bags. One goal is to obtain a high filtration effect, i.e. a high level of retention. For this, the filter pores must be sufficiently small. At the same time, however, the filter pores of the dust filter bag must not clog up, so that a high level of suction or blowing performance, for example of a vacuum cleaner, is maintained, and there is no need to replace the dust filter bag for that reason alone before a specific fill level is reached.

In addition, the dust filter bag must exhibit sufficient mechanical strength so as not to tear or burst while being installed or when full. Appropriate strength is also necessary for manufacturing the bag by way of multiple folding operations.

BACKGROUND OF THE INVENTION

Dust filter bags that are made of a porous nonwoven fabric and a filter paper are known from European Patent 0 635 297 A1, and are processed into double-layer dust filter bags. A melt-blown fine fiber batt, which covers the inner side of the dust filter bag and reinforces the dust filter bag, can be used as the nonwoven fabric. However, the reinforcing effect presented by this approach is not satisfactory.

Further dust filter bags are known from European Patent 0 338 479 B1. The dust filter bag described therein comprises a filter-paper outer ply and an internally located nonwoven fabric. The nonwoven fabric is configured as a fine-fiber nonwoven fabric and is also arranged on the inflow side. The fine fibers of the fine-fiber nonwoven fabric can be applied in the thermoplastic state directly onto the filter paper and joined to it. The fine-fiber nonwoven fabric can be joined to a support element which is also made of nonwoven fabric. To produce the semifinished bag, a tube is formed from the laminate and is closed with a longitudinal seam. Pieces of finite length are then cut off from the endless tube on a bottom-seam drum. An air pulse is used to open the tube ends on one side in order to ensure the formation of tabs which are turned over and adhesively bonded to one another. However, because the two internally located nonwoven fiber plies can easily weld to one another during the cutting process, they can no longer reliably be opened with the air pulse.

German Patent 196 06 718 A1 furthermore discloses a multiple-ply filter pouch that has a first inner ply made of a fine-fiber nonwoven fabric, a second outer ply made of a plastic matted-fiber material, and a third ply, arranged before the first ply in the flow direction, made of a paper material. This creates the filtration effectiveness of the ply made of paper material, since with an external arrangement, the actual filtering effect occurs first.

A further disadvantage of the known dust filter pouches is the fact that when water or other fluid is drawn in along with the air being cleaned, the filter paper ply softens and its strength is impaired, creating the risk of tearing and contamination of the environment during vacuum cleaning or when the dust filter bag is removed. The filtering effect in terms of ultrafine particles is less than satisfactory.

SUMMARY OF THE INVENTION

The present invention provides a bag in which the fiber layer contains melted polymer regions and, because of the polymer regions, is additionally consolidated within itself and joined to the paper layer. The polymer regions have a welded surface area of 0.5 to 10% of the surface. Consequently, loss of strength in the paper layer no longer results in damage to the dust filter bag. Even in the event of tearing in the paper layer in the interior of the dust filter bag, emergence of dust particles from the interior of the dust filter bag is prevented by the externally located fiber layer. The presence of a welded area of the polymer regions equaling 0.5 to 10% of the surface area, preferably 1 to 3%, results in sufficient laminate strength with a tolerable increase in the pressure differential.

Despite the possibility for water uptake, the use of the paper layer, which is advantageous for the creation of folds, can be retained. The reason is that only with a paper layer, as opposed to a pure fiber layer made of polymer fibers, does the dust filter bag become foldable. Foldability can be improved by way of a denser pattern of melted polymer regions in the region of the edges.

A minimum extension of the polymer regions of 1 mm in terms of length and/or width, and optionally also diameter, has proven particularly suitable for creating sufficient adhesion of the fiber structure on the paper layer.

The polymer regions can be penetrated at least partially into the paper layer, in which they bring about an additional and semi-hard consolidation of the fiber structure. The fragile structure of the paper bond is thereby changed positively. The moisture resistance and/or tear resistance of the paper layer are definitely improved by the polymer regions.

The thickness of the polymer region can be less than the thickness of the layers resting against one another in isolation, but in particular less than the thickness of the paper layer outside the polymer region. The gas permeability in the polymer region is thereby reduced to a fraction of the value outside the polymer region. In this region, the fiber layer—made of synthetic polymer fibers—is compressed into a compact material.

The fibers can be electrostatically charged in order to achieve an improvement in the filtering effect with respect to ultrafine dusts.

In addition to the fiber layer made of polymer fibers arranged on the downstream (clean-air)side, it is optionally possible to provide on the dusty-air side a further, supplementary fiber layer made of synthetic polymer fibers, and to bring about a further improvement in specific properties. This requires accepting, however, an increase in the cost of the dust filter bag. What is preferred in the context of the present invention is therefore an embodiment in which a layer of synthetic polymer fibers is provided only on the downstream side.

The fiber layer can be made of an at least inherently strong nonwoven fabric, so that even if the paper layer is completely destroyed, the dust filter bag remains sufficiently stable and effective in terms of filtration. Hygienic disposal of the dust filter bag that is at least partly filled with dust is thus possible even in such cases. The nonwoven fabric can be consolidated in moisture-stable fashion by mutual adhesive bonding and/or wrapping of the fibers and/or threads constituting it; optionally it can contain melted polymer regions and can additionally, by way of such regions, be consolidated within itself and joined to the paper layer. In this context, it has proven to be advantageous that the polymer regions be melted in window-like fashion. This results in consolidation zones that impart improved strength to the nonwoven fabric, in particular if the polymer regions are of bar-shaped configuration.

The polymer regions can be divided in the manner of a honeycomb or waffle pattern in order to form dust chambers. While the paper, because of its paper bond, behaves in rigid and inflexible fashion with respect to the air pressure that acts on it while the dust filter bag is being used as intended, what results on the downstream side is an elastic deformation of the fiber layer in the in-between zones of the honeycomb or waffle pattern. This results in the formation of dust chambers in which ultrafine dusts can collect. An embodiment of this kind has therefore proven to be excellent especially in terms of the retention of allergens.

The bars forming the polymer regions need not be configured in linked fashion, but rather can also be offset from one another, i.e. can be arranged without contact.

According to a further aspect of the invention, the dust filter bag is configured so that the fiber layer comprises at least two sublayers. This is particularly advantageous if the sublayers are to perform different functions.

In particular, the sublayer facing away from the paper layer of the dust filter bag can be made of a spun nonwoven fabric. This spun nonwoven fabric generally exhibits a high level of resistance to abrasion. This is important if the dust filter bag comes into contact with rough surfaces during manufacture, installation, or operation.

In addition, at least one sublayer adjoining the paper layer and made of microfibers can be present. In this layer, which can comprise a melt-blown nonwoven fabric, improved filtration properties are achieved, in particular in terms of ultrafine dusts, thus extending the field of application of the dust filter bag.

A particularly good cleaning effect with sufficient mechanical strength for the dust filter bag is obtained if the fiber layer made of microfibers has a weight per unit area of 5 g/m² to 40 g/m² (ISO 536), with a total weight of 5 to 50 g/m² for the fiber layer. The paper layer advantageously has a weight per unit area of 20 g/m² to 100 g/m² (ISO 536). The air permeability of the ready-to-use product is from 100 to 300 l/m²s at a differential pressure of 200 Pa (DIN 53887).

In order to ensure optimum processability in the production of the semifinished bags, the dust filter bag must exhibit properties similar to those of paper. This is ensured by the fact that the nonwoven fiber layers are joined in sufficiently permanent fashion to the paper. To achieve sufficient strength in the region of the longitudinal seam of the semifinished bag, the edge region is preferably particularly reinforced; this can be accomplished by way of a welding and/or adhesive bonding apparatus.

Because the nonwoven fabric layer is arranged on the downstream side, no welding of the nonwoven fabric plies occurs when the tube is cut to length, so that the tube ends can be reliably opened with an air pulse.

BRIEF DESCRIPTION OF THE DRAWINGS

An exemplary embodiment of the invention is depicted in the drawings, in which:

FIG. 3b shows a scanning electron microscope image of the section of FIG. 3a.

DETAILED DESCRIPTION

Figure 1:
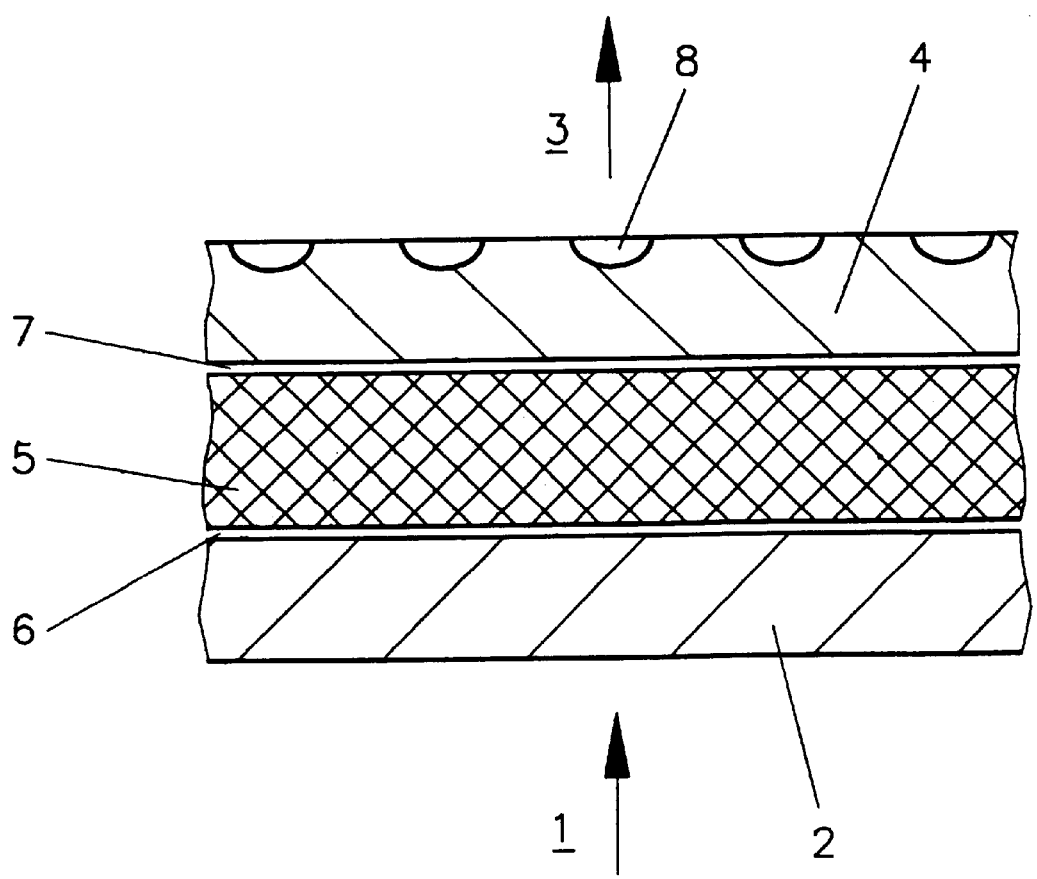
FIG. 1 shows a section taken through a three-ply dust filter bag constructed according to the principles of the invention.

FIG. 1 depicts a dust filter bag according to the invention. It comprises a paper layer 2 facing toward the dusty-gas side or intake side 1. Facing toward the downstream, or clean-air side 3 is a fiber layer made of polymer material that is constituted from a spun nonwoven fabric 4 comprising thermoplastic fibers. Located between paper layer 2 and spun nonwoven fabric 4 is a further fiber layer made of polymer material, comprising a melt-blown nonwoven fabric 5 made of thermoplastic fibers.

In FIG. 1, paper layer 2 and melt-blow nonwoven fabric 5 rest substantially freely (i.e., without constraint) on one another, so that a cavity 6 is present. Spun nonwoven fabric 4 also rests unconstrainedly on melt-blown nonwoven fabric 5, so that a cavity 7 is enclosed in some regions.

To enhance the strength of spun nonwoven fabric 4, it can be consolidated at physically spaced-apart points by spot welding, as a result of which surface structures 8 are present.

Figure 2:
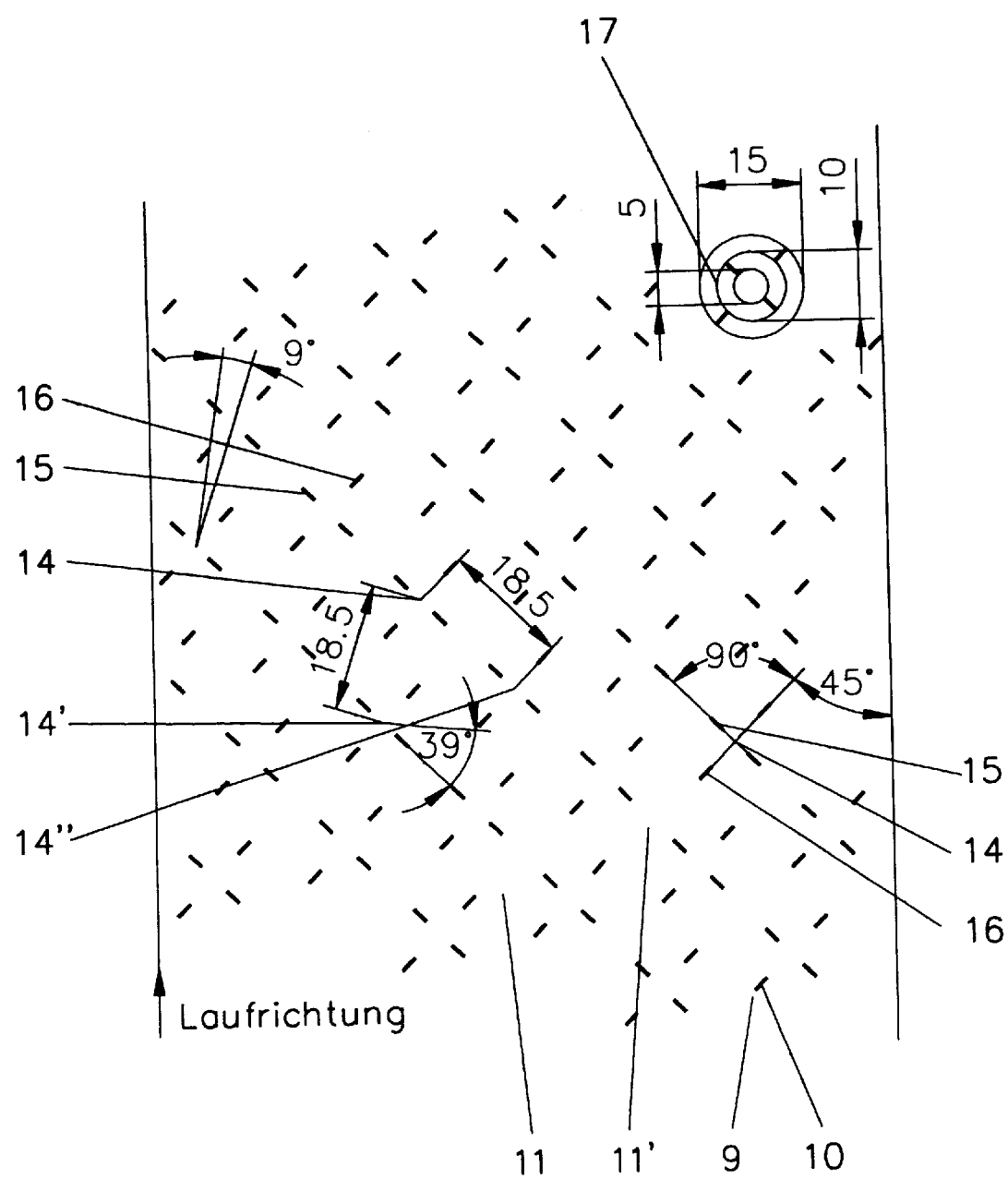
FIG. 2 shows a plan view of the outer side, formed by the fiber layer, of the dust filter bag, with the melted polymer regions.

FIG. 2 shows the downstream side surface of the dust filter bag. The melted polymer regions 9, which are present in the form of bars 10, are evident. Bars 10 are arranged at an offset from one another, and do not touch one another. They can be arranged in any desired pattern with respect to one another and can form, for example, a waffle or honeycomb pattern. Advantageously, the individual chambers 11, 11' bounded by the bars are configured continuously with one another via transverse connections, so as optimally to use the total filter area available and to prevent pressure peaks in individual chambers. For this purpose, the overall bar structures can also be constituted by a succession of individual welding zones which are at a distance from one another.

Bars 10 thus enclose dust pockets 11, 11' which, because of the noncontinuous structure of polymer regions 9 or bars 10, are connected to and continuous with one another.

Since dust pockets 11 are not sealed off from one another, an exchange of material from one dust pocket 11 into an adjacent dust pocket 11' is also possible, for example after clogging of the pores of one chamber has occurred, if those of an adjacent chamber are still available.

A wide variety of forms of the arrangement of the bars or other polymer regions is conceivable from this standpoint, in order to enhance the strength and at the same time allow dust pockets to be delimited from one another.

A bar-shaped pattern is shown, with inner bars 15 arranged about a center 14 and outer bars 15 arranged circumferentially with respect to them, each offset by 90 degrees, outer circle 17 around inner bars 15 being coincident with the inner circle of outer bars 16. Bars 15, 16 each extend out from center 14 at an angle of 45 degrees from the direction of travel.

Centers 14, 14', and 14" are offset 9 degrees clockwise with respect to the direction of travel, and 39 degrees clockwise with respect to a line perpendicular to the direction of travel, so that they form an equilateral triangle.

In principle, it is also possible to use, instead of bars 15, 16 arranged around centers 14, 14', and 14', dot-shaped polymer regions arranged in centers 14, 14', 14" themselves. In this case, however, the stability of the join decreases even though the joining surface remains the same, since no further structures are present between these centers. Material exchange from one dust pocket into the other is promoted, however, thus preventing premature clogging of subregions.

Figure 3A:
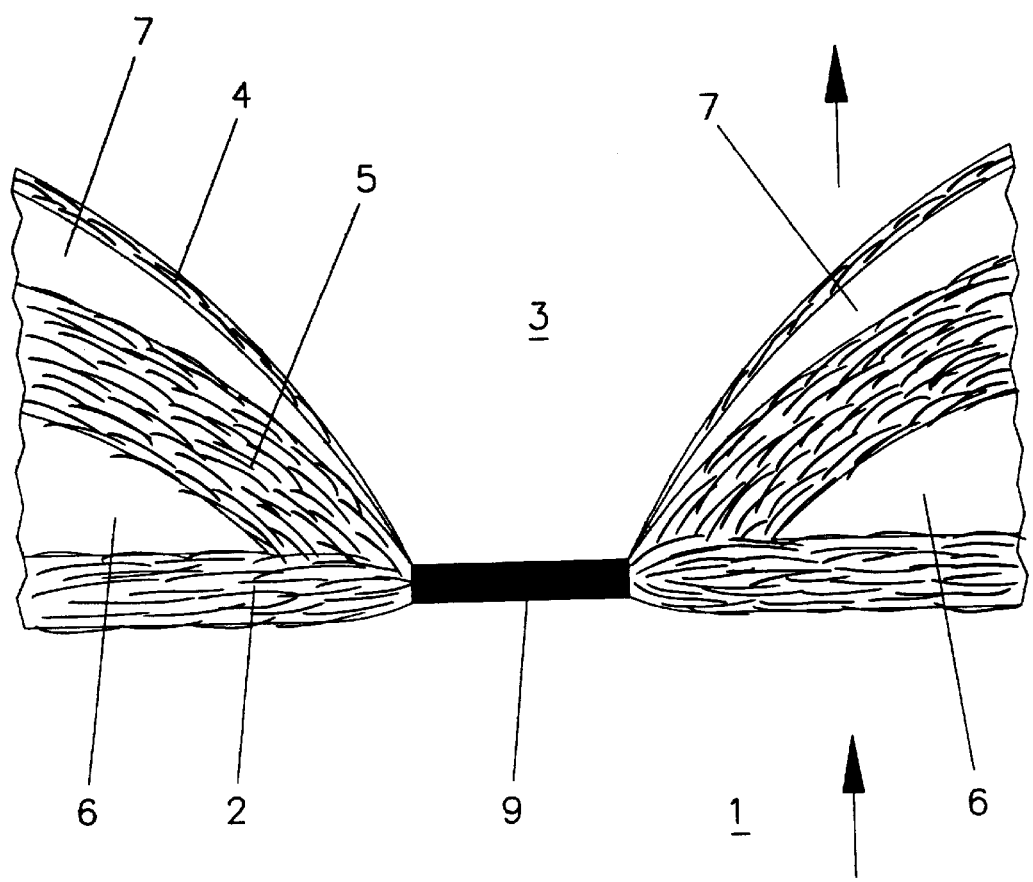
FIG. 3a shows a section taken through the three-ply dust filter bag of FIG. 2 in the region of the melted polymer regions.

FIG. 3a shows a section in the region of polymer regions 9 or bars 10 (FIG. 2). Polymer regions 9 can be produced by ultrasonic calendering. In this, the thermoplastic material of spun nonwoven fabric 4 and of melt-blown nonwoven fabric 5 is caused to melt at predetermined points, and is joined at high pressure to paper layer 2. The type of paper is immaterial per se, provided it affords adequate filter properties.

In this process, the melted thermoplastic material of spun nonwoven fabric 4 and melt-blown nonwoven fabric 5 penetrates at least partially into paper layer 2. In polymer regions 9, the properties of spun nonwoven fabric 4 and melt-blown nonwoven fabric 5 are no longer retained because of the calendering; in particular, those regions are no longer active, or only insignificantly active, in terms of filtration.

The thickness of polymer region 9 is less than the thickness of paper layer 2, so that polymer region 9 is particularly compact.

Between polymer regions 9, cavities 6 form dust pockets 11 which receive the ultrafine dust, if the latter is not directly stored in the paper or in melt-blown nonwoven fabric 5. Spun nonwoven fabric 4, with higher strength values and hence relatively lower filter effectiveness, serves to protect melt-blown nonwoven fabric 5, which is sensitive to abrasion. Its task is essentially to protect melt-blown nonwoven fabric 5 from abrasion and to impart to dust filter bag 12 a substantially improved tear resistance while preventing any appreciable impairment of the filtering effect, especially if wetting occurs. In particular, it prevents paper layer 2 of dust filter bag 12 from tearing and completely losing its filtering effect. It is even possible for paper layer 2, once wetting has occurred, to dry out again during use as intended with no appreciable impairment of the filtering effect.

Figure 3B:
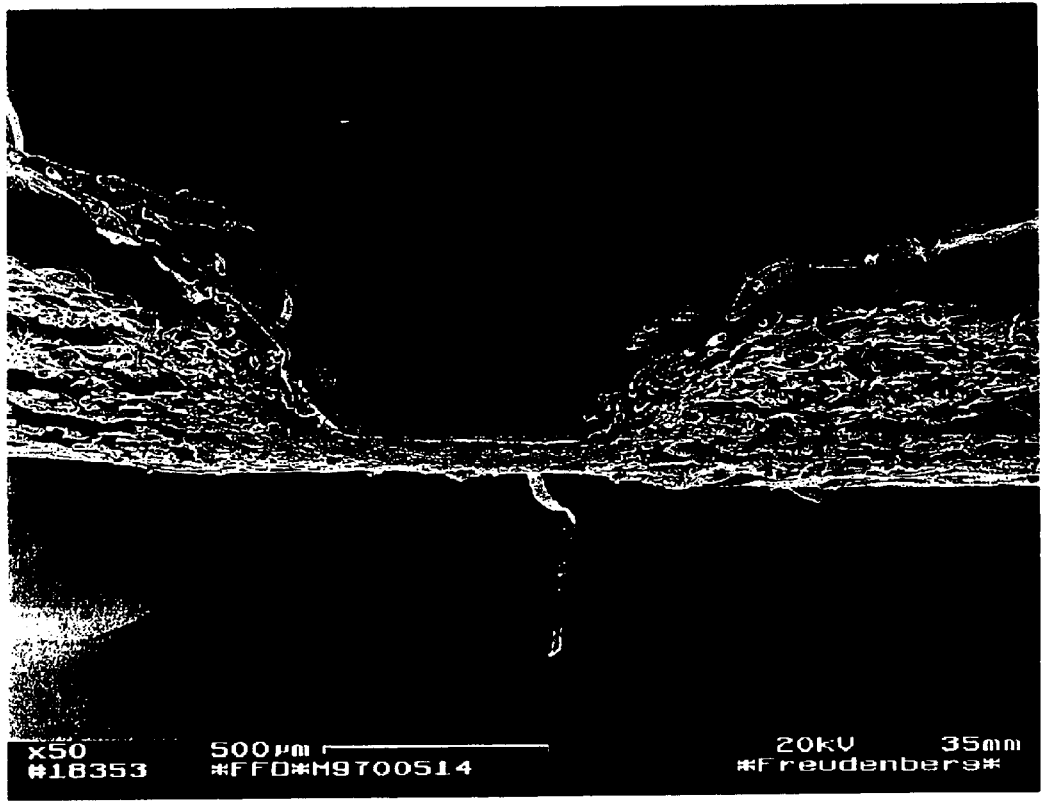

FIG. 3b depicts a scanning electron microscope image of the nonwoven fabric configuration shown schematically in FIG. 3a.

Figure 4:
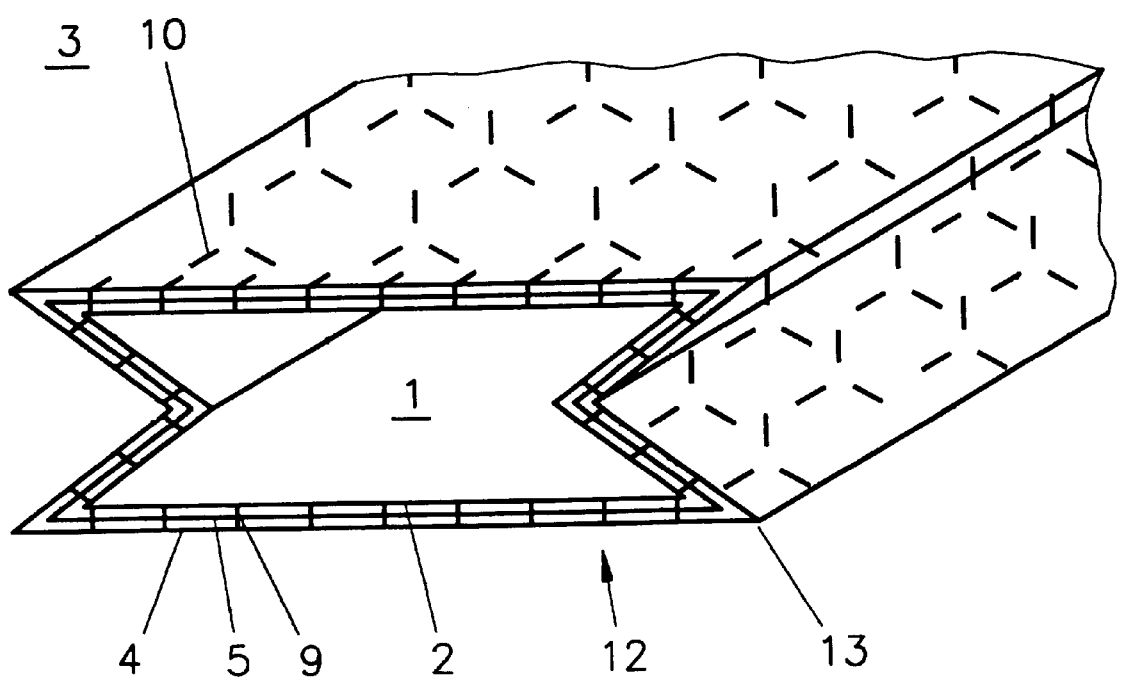
FIG. 4 shows a cut-open folded vacuum cleaner bag.

FIG. 4 depicts a three-ply dust filter bag 12 with multiple folds 13. Paper layer 2, spun nonwoven fabric 4, and melt-blown nonwoven fabric 5 are not inserted into one another but rather, proceeding from a flat material, reshaped into dust filter bag 12 by being folded together.

Paper layer 2, spun nonwoven fabric 4, and melt-blown nonwoven fabric 5 are joined by way of polymer regions 9. If liquid gets into the interior space delimited by paper layer 2 that faces toward the dusty-air side, and if paper layer 2 softens as a consequence thereof, spun nonwoven fabric 4 thus reliably holds dust filter bag 12 together.

In principle, a single nonwoven fabric made of polymer fibers can substitute for spun nonwoven fabric 4 and melt-blown nonwoven fabric 5 if the filter properties and strength properties are sufficient.

Lamination of paper layer 2 to fiber layer 4, 5 can be accomplished with any usual method, for example hot melt laminating, application of adhesive compounds, etc., but is preferably performed by thermal welding.

An increased number of polymer regions can be provided in the edge region in order to enhance strength in the region of the longitudinal seam of the semifinished bag.

What is claimed is:

1. A dust filter bag, comprising:
   a paper layer having an upstream side and a downstream side;
   a fiber layer comprising synthetic polymer fibers that is arranged on the downstream side of the paper layer, wherein the fiber layer comprises melted polymer regions at which it is additionally consolidated within itself and joined to the paper layer;
   wherein the polymer regions are welded together with an aggregate weld area of 0.5 to 10% of the surface area of the fiber layer.

2. The dust filter bag as defined in claim 1, wherein the polymer regions are at least one mm in their length and/or width.

3. The dust filter bag as defined in claim 1, wherein the thickness of the polymer region is less than the thickness of unjoined paper layer fiber layers resting on one another, and also is less than the thickness of the paper layer outside the polymer region.

4. The dust filter bag as defined in claim 1, wherein the fibers are electrostatically charged.

5. The dust filter bag as defined in claim 1, wherein the fiber layer is made of at least one inherently strong nonwoven fabric.

6. The dust filter bag as defined in claim 1, wherein the nonwoven fabric is consolidated by mutual adhesive bonding and/or wrapping of the fibers and/or threads constituting it.

7. The dust filter bag as defined in claim 1, wherein the polymer regions are configured in window-like fashion.

8. The dust filter bag as defined in claim 1, wherein the polymer regions are configured or divided in bar-shaped fashion.

9. The dust filter bag as defined in claim 1, wherein the polymer regions are divided in the manner of a honeycomb or waffle pattern in order to form dust chambers.

10. The dust filter bag as defined in claim 1, wherein the polymer regions penetrate at least partially into the paper layer.

11. The dust filter bag as defined in claim 1, wherein the moisture resistance and/or tear resistance of the paper layer is augmented by the polymer regions.

12. The dust filter bag as defined in claim 11, wherein the fiber layer comprises at least two sublayers, wherein the first sublayer is adjacent the paper layer and the second sublayer is generally spaced from the paper layer by the first sublayer.

13. The dust filter bag as defined in claim 12, wherein the second sublayer is made of a spun nonwoven fabric.

14. The dust filter bag as defined in claim 13, wherein the first sublayer contains microfibers.

15. The dust filter bag as defined in claim 12, wherein the first sublayer contains microfibers.

16. The dust filter bag as defined in claim 15, wherein the first sublayer has a weight per unit area of 5 to 40 g/m$^2$.

17. The dust filter bag as defined in claim 1, wherein the fiber layer overall has a weight per unit area of from 5 g/m$^2$ to 50 g/m$^2$.

18. The dust filter bag as defined in claim 1, wherein the paper layer has a weight per unit area of 20 g/m$^2$ to 100 g/m$^2$.

19. The dust filter bag as defined in claim 1, wherein the dust filter bag is configured for use as a vacuum cleaner bag.

20. The dust filter bag as defined in claim 1, wherein the polymer regions have a welded area of from 1 to 3% of the surface area.

21. The dust filter bag as defined in claim 1, wherein the paper layer and the fiber layer have a higher proportion of polymer regions in an edge region.

* * * * *